United States Patent

Wu et al.

[11] Patent Number: 6,094,504
[45] Date of Patent: Jul. 25, 2000

[54] APPARATUS FOR POSITIONING A LINE SEGMENT, METHOD OF POSITION COMPENSATION AND IMAGE/POSITION SCANNING SYSTEM

[76] Inventors: Chwan-Jean Wu, 3rd Fl., No., 14, Lane 106, Sec. 3, Minchuan E. Rd.; Chwan-Chia Wu, 4th Fl., No., 14, Lane 106, Sec. 3, Minchuan E. Rd., both of Taipei, Taiwan

[21] Appl. No.: 08/974,270

[22] Filed: Nov. 19, 1997

[51] Int. Cl.[7] .............................. G06K 9/34; G06K 9/36
[52] U.S. Cl. ......................... 382/173; 382/291; 382/309
[58] Field of Search .................................. 382/309, 310, 382/318, 173

[56] References Cited

U.S. PATENT DOCUMENTS

| 4,677,683 | 6/1987 | Pferd, III et al. | 382/65 |
|---|---|---|---|
| 5,026,953 | 6/1991 | Hsu | 178/19 |
| 5,854,449 | 12/1998 | Adkins | 178/18.02 |
| 5,867,152 | 2/1999 | Sextro | 345/207 |
| 5,930,406 | 7/1999 | Itsuzaki et al. | 382/291 |

*Primary Examiner*—Joseph Mancuso
*Assistant Examiner*—Yosef Kassa
*Attorney, Agent, or Firm*—Kolisch Hartwell Dickinson McCormack & Heuser

[57] ABSTRACT

An apparatus for tracing the locations of a line segment moving across a planar tablet is disclosed in the present invention, which includes a microprocessor, a positioning coil driving circuit, a plurality of positioning coils, a planar sampling circuit, a coordinate acquisition circuit and a counting circuit for the purpose of determining the location of a line segment relative to the planar tablet at a given time instant. A location of the line segment is determined by energizing a pair of positioning coils, each representing an end of the line segment, alternately and thereby achieving positional coordinates of these two ends. Repeating of such positioning operation results in a trace of the trajectory of movement of the line segment. A simple and effective position compensation method for offsetting the positioning error when locations of a physically installed or logically perceptible line object, instead of the line segment pointed by the two positioning coils, are to be traced. This invention also brings forth a new type of image scanning system which, during a scanning operation, captures visually perceptible information of the scanned object together with the corresponding spatial information and thereby representing the scanned object as a two-dimensional computer image wherein each image pixel is stored in a memory location uniquely determined by a positional coordinate relative to the planar tablet.

5 Claims, 10 Drawing Sheets

APPARATUS FOR POSITIONING A LINE SEGMENT, METHOD OF POSITION COMPENSATION AND IMAGE/POSITION SCANNING SYSTEM

BACKGROUND OF THE INVENTION

1. The Field of the Invention

The present invention relates to an apparatus for determining the location of a line object lying on a tablet by detecting electromagnetic induction between the positioning coils corresponding to that line object and the grid-shaped conductors formed in the grid structures of the tablet, and to an apparatus for tracing and recording the movement of the line object on a tablet, and in particular to a method for compensating positioning errors resulting from the displacement in between the positioning coils and the line object. This invention also relates to an image scanning system which offers a capability of image scanning and position determination. The position compensation method, which is used to offset the displacement error, is of particular importance as a displacement error in between the positioning coils and the actual location of the target line object is difficult to prevent due to (1) the limitation of the physical alignment of positioning coils and the target line object; and (2) the operation precision of assembly workmanship.

2. Description of the Related Art

Most computer applications nowadays employ a pointing device to perform graphic user interface. The position of an object pointed to can be determined by a prior art mouse or a digitizer depending on the accuracy of positioning required by the applications. On the other hand, there is a lack of apparatus and/or method that can be effectively applied to those applications requiring the recordation of the movement of a line object. Prior art which is disclosed in U.S. Pat. No. 5,355,146 furnishes a similar purpose wherein two mouse roller balls are applied at the bottom of the device for determining the location of a line segment. This prior art, however, has a serious drawback that the position determined is relative to the starting point of a positioning process, not an absolute coordinate to a given referenced space. This limits the use of this device as it can only be moved around a document without lifting the device up for second attempt. The positions determined by two trials will be totally irrelevant and similar to that resulted in the operation of a mouse. Furthermore, positioning errors are usually induced resulting from the slip of the mouse roller balls when they roll over the target document. It is therefore desirable to pursue an effective way and mechanism to resolve the problem of inconsistency among multiple passes of positioning and the problem of positioning errors induced by the sliding friction for those applications requiring more accurate trace of the movement of a line object.

In the fields of desk top publishing, image processing or other types of multimedia applications, a simple to use yet effective image scanning device to input the desired image data for a computer is required. With the increasing demand of the aforesaid applications, an image scanner has become an essential peripheral to computer applications. Conventionally, image scanners are classified into three major categories,—flatbed, sheet-feed and hand-held—, among which the hand-held scanner is most compact and is indeed portable for mobile applications. Hand-held scanners, however, have a number of drawbacks in many respects that mean hand-held scanners can only be employed for low-end applications.

Hand-held scanners are defective in a number of respects. First, they must be carefully moved across a column of a document without the hand-held scanner being twisted as it is drawn across the column. If any twisting motion is introduced into the hand scanning, the resultant computer image will be deformed. Even if the hand-held scanner is carefully moved and uniform motion of the two ends of the hand-held scanner is achieved, the resultant computer image may still be distorted. This is because the roller of the hand-held scanner may slip due to friction between the roller and the target document when the scanner is moving across the document as such the scanned image lines may not be equally spaced. As a result, the resultant image may be shrunk in one area and expanded in others.

Furthermore, if hand-held scanner captures less than all of the material on a document, it is required to move the hand-held scanner back and forth across the document via multiple passes to cover the desired area of the document entirely. However, this requires alignment of the sub-images which are scanned into the computer by different scanning operations of the hand-held scanner. Attempts of making such alignment automatically have been conducted, but none of the prior art, either by hardware or by software, achieves a satisfactory result. Therefore, the sub-images resulted from multiple scans can only be assembled manually by the user through cumbersome editing processes.

Accordingly, it is an object of the present invention to achieve a new hand-positionable data input device for a computer that is simple to use in locating the position of a traceable line object and more flexible and accurate than those known to the prior art and further that overcomes the defects of the prior art. It is also an object of the present invention to achieve a new type of image scanning system that captures image together with the corresponding spatial information relative to a given coordinate system. This results in freehanded manual use of the image scanning device without suffering the defects that are common to the prior art hand-held scanner.

SUMMARY OF THE INVENTION

The present invention is directed to an apparatus for positioning two ends of a line segment and a method for offsetting the displacement errors between the positioned line segment and the corresponding line object. Therefore, it is a primary object of this invention to create a new type of hand data entry device which can accurately locate the position of a line segment and by means of a position compensation method disclosed in this invention.

The present invention also contemplates designing a new type of image scanning system which captures image data together with the spatial information simultaneously and thereupon a one-to-one mapping of the image data to the memory location in a computer can be achieved. This allows a freehanded use of image scanner which facilitates simpler and user friendlier scanning of image document.

In accordance with one aspect of the invention, there is provided an apparatus for locating a line segment with functions of positioning two ends of that line segment and tracing the trajectory following the movement of the line segment thereof, which includes a microprocessor, a positioning coil driving circuit, a plurality of positioning coils (pointing devices), a planar sampling circuit with grid-shaped conductors, a coordinate acquisition circuit and a counting circuit.

In accordance with another aspect of the invention, there is provided an apparatus for positioning two ends of a line segment, further including a method of tracing and determining the trajectory of the movement of the line segment, in which the positions of the two pointing devices are sensed and determined by a time-division switching manner. Since two geometrically separate points determine a line segment and a straight line passes through these two points, the location on which the line segment lies can thereof be obtained. Continuous tracing and determining the location of the line segment results in a trajectory trace of the movement of this line segment. The operation of the determination of the location of a line segment includes steps of: (1) determining the location of one pointing device which is at one end of the line segment and recording its coordinate; (2) positioning the other end of the line segment and recording its coordinate; (3) combining the coordinates of the two ends to achieve the location of the line segment at a given time instant that positioning is performed ; (4) repeating step (1) to step (3) every other fixed time interval for positioning the locations of the line segment until the operation is terminated.

In accordance with still another aspect of the invention, there is provided an apparatus for positioning two ends of a line segment, further including a simple but effective position compensation operation for offsetting the position displacement from two pointing devices to the two ends of a physically installed or logically perceptible line object. Thus the ability of locating a line object with two ends at which the pointing devices are not possible to be installed precisely is facilitated.

In accordance with yet another aspect of the invention, there is provided an image scanning device which is an integration of an optical scanning device, a line segment positioning apparatus, a line segment location method and a position compensation method for scanning an image along any direction at any angle desired with as many scanning passes as desired without the image being deformed.

BRIEF DESCRIPTION OF THE DRAWINGS

The above objective, other features and advantages of the present invention will become more apparent by describing in detail the preferred embodiments thereof with reference to the attached drawings, in which.

DETAILED DESCRIPTION OF THE PREFERRED EMBODIMENT

Figure 1:
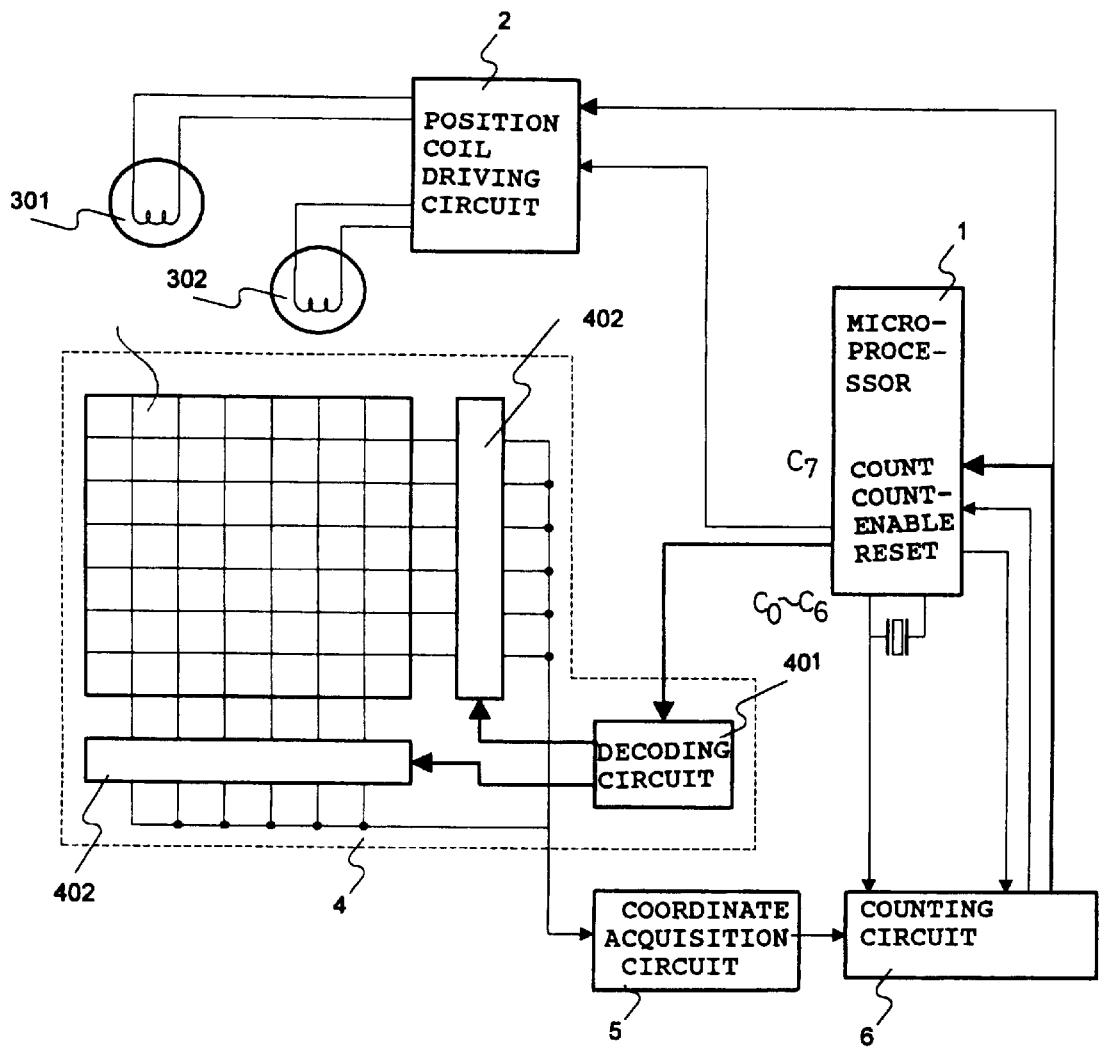
FIG. 1 is a system block diagram of the line segment positioning apparatus of the present invention.
Figure 5:
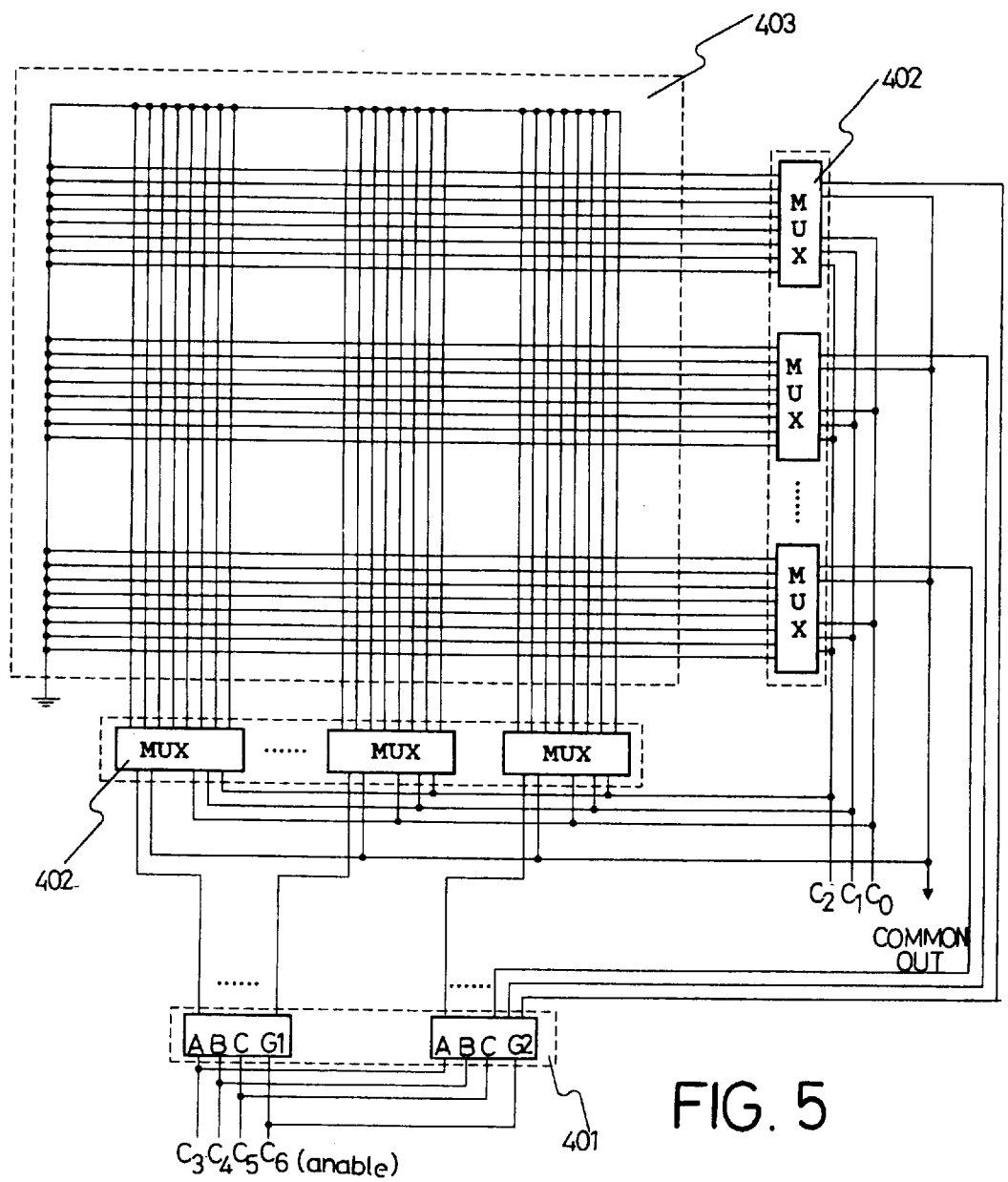
FIG. 5 is a detailed view showing a planer sampling circuit.

FIG. 1 shows a configuration of a preferred embodiment of the present invention for line segment positioning. Two positioning coils 301 and 302 are components for generating reference signals for coordinate positioning, through which coordinates of the centers of the two positioning coils 301 and 302 are determined by means of a planar sampling circuit 4 of a planar tablet, a coordinate acquisition circuit 5, a counting circuit 6 and a microprocessor ($\mu$P) 1. The microprocessor ($\mu$P) 1 continuously generates a modulo 8 binary counting stream with frequency $f_1$ to drive the remaining parts of the present invention in the duration of position determination. Referring to FIG. 5, the most significant bit (MSB) $C_7$, which is the highest order bit, of the counting signal is used to drive the positioning coils 301 and 302 alternately to furnish a time-division switching mechanism as described above. The three bits with the lowest order, $C_0$ to $C_2$, of the counting signal are used by the multiplexers (MUXs) 402 of the planar sampling circuit 4 to select a conducting channel. The four bits with the second higher order, $C_3$ to $C_6$, are used by the decoding circuit 401 to enable a desired multiplexer 402 and thereby by selecting via $C_0$ to $C_2$, a wire loop in the grid wires array (which is formed by a set of coordinate grid lines) 403 on the planar tablet is conducted in order to sample a signal relevant to the coordinate of the positioning coil 301 (or 302). The wire loops which are corresponding to the parallel grid lines along a given direction are conducted in sequence to perform a position scan along one coordinate axis. The positioning coil 301 (or 302) that generates the magnetic field lies on the grid wires array 403 and the electromagnetic force induced around a loop of the grid wires array 403 is acquired by a multiplexer 402 and then, processed by a coordinate acquisition circuit 5 through which the characteristic output waveform from electromagnetic induction between the grid wires and the positioning coil is resulted.

Figure 2:
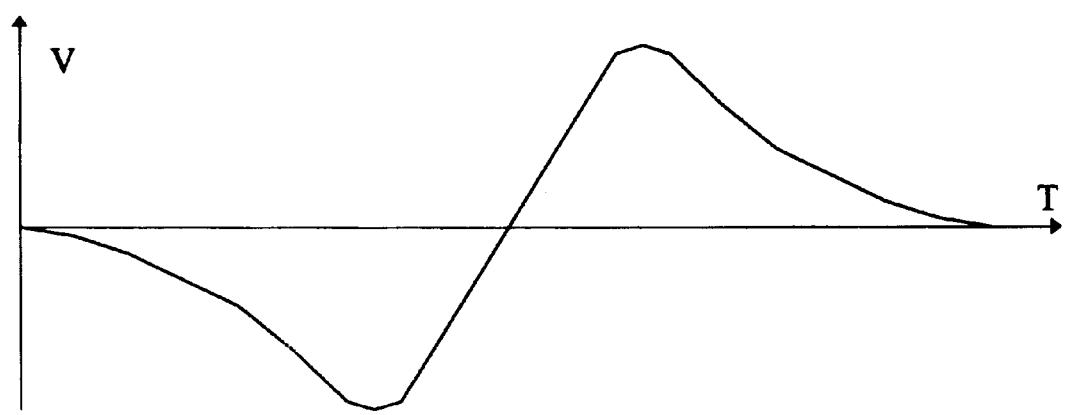
FIG. 2 shows a characteristic output waveform of the electromagnetic inductance between a positioning coil and the grid wires array.

It is noted that the center of positioning is located at a point where the aforesaid response passes through a transition such as a change in phase or a change from a positive amplitude to a negative amplitude as illustrated in FIG. 2. Further, since the characteristic output is a time-domain response characterizing the electromagnetic induction along the scanning direction of a coordinate axis, determination of the coordinate of the center of the positioning coil requires transformation of the characteristic response from time domain to space domain. This requires an accurate measure of the response from a given reference point to the zero crossing point and based on which the time-space transformation can be performed. The zero crossing point is determined by a threshold circuit 502 which performs a two-value logic operation on the aforementioned characteristic response to distinguish a signal with positive amplitude from that with negative amplitude. The zero crossing point is thereof occurs at the transition where the output of the threshold circuit changes from high level to low level, or vice versa, depending on the polarity chosen by the positioning coil. The time-space transformation requires a measure of the elapsed time from a given reference point to the zero crossing point of the characteristic response. This can be achieved by multiplying the binary characteristic response, which is resulted from the aforesaid threshold operation, by the system clock and then counting the length of the high-level signal by a counting circuit 6. The time-space transformation thus comprises the steps of:

(a) storing the resultant data $D_{COUNT}$ counted by the counting circuit 6;

(b) determining the elapse time from the beginning of position scan to the time that the zero crossing point occurs, T, by:

$$T_{elapse} = D_{COUNT} \times t_{COUNT}$$

where $t_{COUNT}$ is the period of the clock pulse to activate a counting operation of the counting circuit 6;

(a) deriving the coordinate along a particular coordinate axis by time-space transformation given below:

$$\text{Coordinate} = L \times T_{elapse}/T$$

where L is the length of the aforesaid coordinate axis and T is the time that is taken to completely scan of all of the grid lines along the direction of this coordinate axis.

The coordinate of one coordinate axis, said X-axis, of the center of positioning coil is thereof determined by performing calculation of time-space transformation. The coordinate of the other coordinate axis, said Y-axis, can be similarly determined by having the grid wires become conducting, one at each time, along a direction perpendicular to that of the previous position scanning operation. Since the magnetic fields generated by the two positioning coils 301 and 302 will produce mutual interference on each other which will deteriorate the quality of positioning operation, the present invention thereby adopts a time-division switching mechanism for driving the two positioning coils 301 and 302 alternately to prevent mutual interference. This may introduce positioning error as the positioning coil 302 may have been moved to a new position other from the location when the positioning coil 301 is positioned. The positioning error, however, can be minimized as long as the switching time for driving the two coils is fast enough and the moving speed of the line object is restricted to a certain upper limit. For example, suppose the target line object is set to move at nearly a constant velocity and positioning of the line object is performed two hundred times per second. Further, the upper limit of the moving speed is limited to one inch per second. Then the positioning error is confined within 2.5× $10^{-3}$ inches.

Once the coordinates of the positioning coils 301 and 302 are achieved, the positions of the two ends of the target line object can be determined by performing position compensation by adopting a position compensation method disclosed in this invention.

The operation principle of assembly the system of the present invention will now be explained in detail as follows.

Microprocessor ($\mu$P) 1

The $\mu$P 1 is responsible for generating various sequential pulse signals to perform normal operation of the system, conducting time-space transformation as described above, performing position compensation and transmitting the resultant coordinates of the two ends of the line object to an application system.

Positioning Coil Driving Circuit (PCDC) 2

Figure 3:
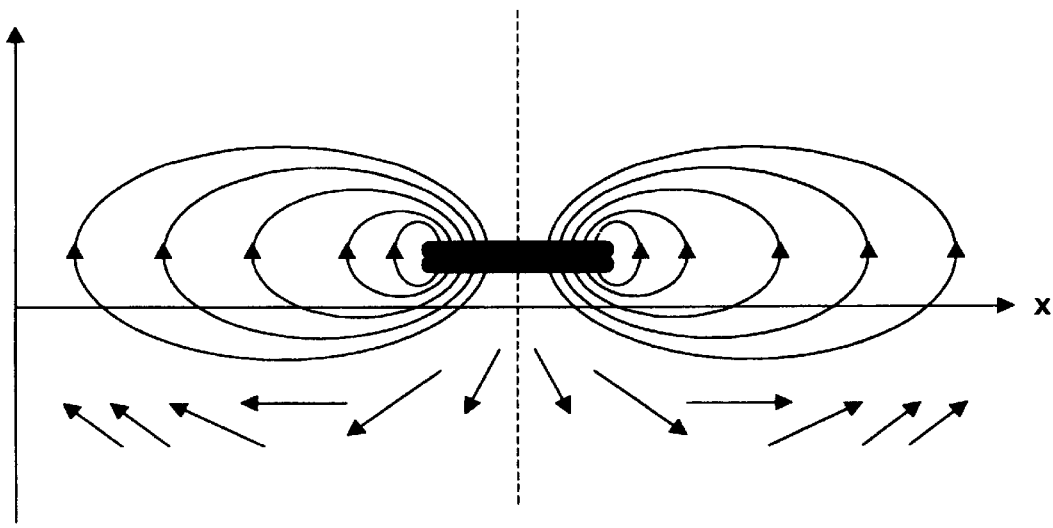
FIG. 3 is a cross-section view showing the magnetic flux of the positioning coil.
Figure 4:
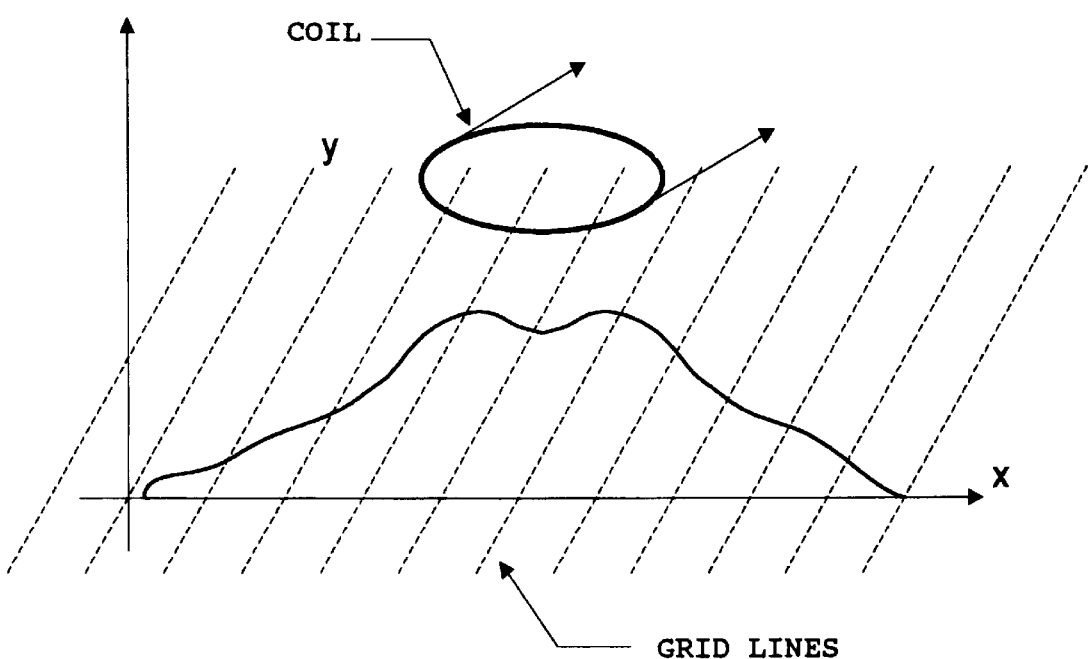
FIG. 4 is a diagram showing the intensity of a magnetic field around the positioning coil.

A major function of the PCDC 2 is to provide driving signal to excite a positioning coil. The digital pulse stream indicated by $C_7$ from the $\mu$P 1 is used as a selection signal for the PCDC 2 to drive the positioning coils 301 and 302 alternately. The OCDC 2 also converts a digital pulse stream from the output of the counting circuit 6 to an alternating circuit to excite a positioning coil 301 (or 302). A magnetic field is induced after the alternating current flows through the positioning coil 301 (or 302) and the pattern of the magnetic flux of the induced magnetic field is illustrated in FIG. 3. The phase of the horizontal component of the magnetic flux on the left hand side of the coil is opposite to the phase of the horizontal component on the right hand side. FIG. 4 shows the intensity distribution of the magnetic field.

Positioning Coils 301 and 302

To achieve an objective of acquiring the coordinates of the two ends of a line segment effectively, two positioning coils 301 and 302 are allocated to the two ends of the line segment. The two positioning coils 301 and 302 are alternately driven by the $\mu$P 1 based on the time-division principle. As described above, a time-varying magnetic field is induced by the alternating current passing through a positioning coil 301 (or 302). According to Faraday's law, this time-varying magnetic field will further result in electromagnetic induction around a conducting loop. Consequently, the conducting channel determined by the decoding circuit 401 and an enabled MUX 402 actually forms a conducting loop to sense the potential variation caused by the electromagnetic induction between a positioning coil and a grid-shaped wire loop. This is the basic principle of data acquisition of the planar sampling circuit 4.

Planar Sampling Circuit (PSC) 4

A PSC 4 is used to sense the electromagnetic induction between a positioning coil and a grid line conductor and to perform data acquisition in a position scan operation for use by the circuits of subsequent stages. FIG. 5 shows a configuration of the PSC 4 which is composed of a decoding circuit 401, a plurality of MUXs 402 and a grid wires array 403. The decoding circuit 401 receives a selection instruction $C_3$ $C_4$ $C_5$ $C_6$ from the $\mu$P 1 to enable a predetermined MUX 402. The enabled MUX 402 is used to make a certain predetermined wire in the grid wires array 403 conduct to form a wire loop. A plurality of parallel wires, each extending along a direction of the X-axis or the Y-axis and equally spaced, constitutes the grid wires array 403. A current loop is configured by turning on a channel of a particular Multiplexer 402. Since each time only one single current loop can be selected to conduct by the $\mu$P 1, and the channels are selected one after the other sequentially, the signals received by the posterior-stage circuits are a result of sensing the electromagnetic induction along a direction where the grid wire loop is configured. Therefore, an operation of conducting the grid lines along the X-axis in sequence followed by another operation which conducts the grid lines along the Y-axis sequentially constitute a position scan of the present invention.

Coordinate Acquisition Circuit 5

Figure 6:
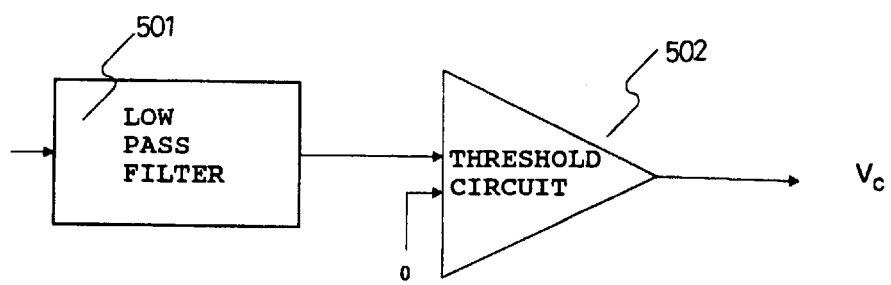
FIG. 6 is a block diagram of the coordinate acquisition circuit.

The purpose of the coordinate acquisition circuit 5 is to obtain the characteristic response of the electromagnetic induction between the positioning coil and the grid wires. Specifically, the coordinate acquisition circuit 5 is responsible for removing the high frequency component of the resultant signal sampled by the planar sampling circuit 4 and produces a characteristic output of the electromagnetic inductance between the grid wires and the positioning coil as illustrated in FIG. 2. This is achieved by amplifying and low-pass filtering the signal sent from the planar sampling circuit 4 through a low-pass filter 501. The resultant characteristic response is further processed by a threshold circuit (comparator) 502 to convert the analog signal to a two-level response via which the zero crossing point of the characteristic response can be located and the aforementioned time-space transformation can be performed by the subsequent operation. A circuit block diagram of the coordinate acquisition circuit 5 is illustrated in FIG. 6.

Counting Circuit 6

The counting circuit 6 is a counter unit of the present invention and is responsible for measuring the elapsed time from the time that a position scan begins to the time when a zero crossing point occurs. This constitutes the essential input for the $\mu P$ 1 to perform time-space transformation for determining the coordinate of the center of a positioning coil 301 (or 302).

Figure 7:
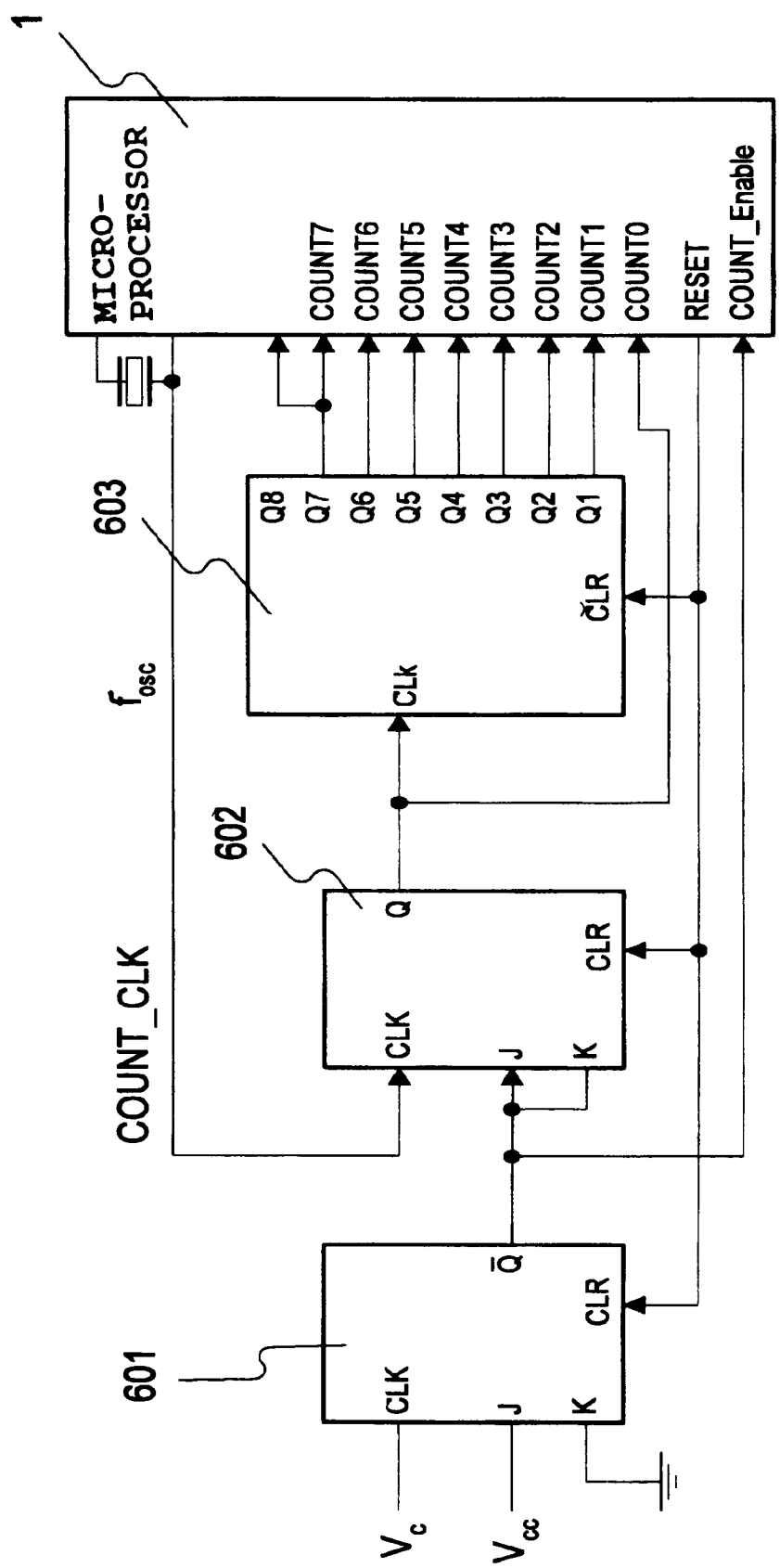
FIG. 7 is a schematic diagram of the counting circuit.
Figure 8:
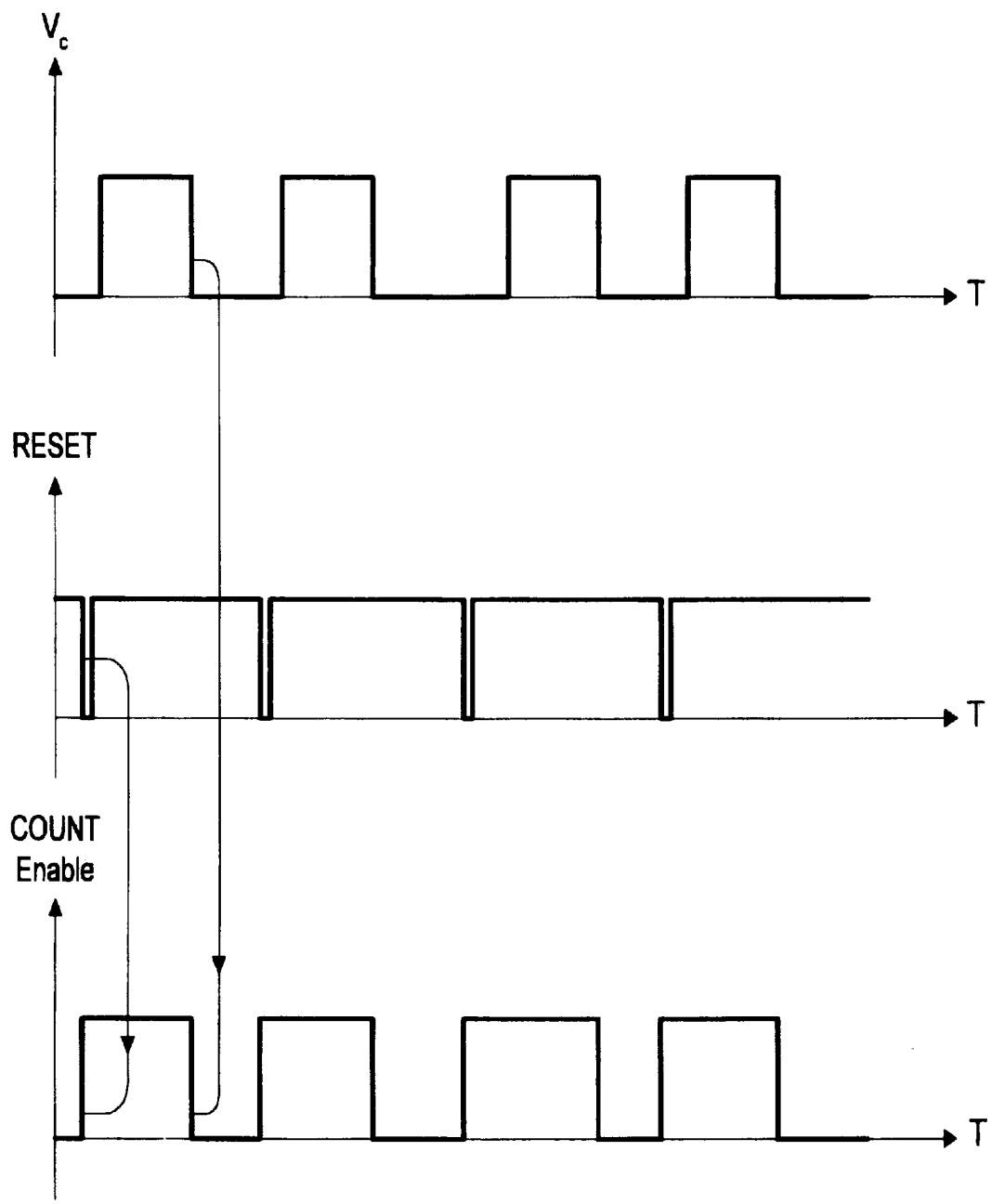
FIG. 8 shows a timing diagram of the counting circuit.

The counting circuit 6 of the present invention is composed of two JK flip-flops 601 and 602, a binary counter 603 and an internal counter of the $\mu P$ 1. The circuit block diagram of the counting circuit 6 is illustrated in FIG. 7. FIG. 7 shows the RESET terminal of the internal counter of the $\mu P$ 1 outputs a counting reset signal to reset counting and is connected to the CLR port of the binary counter 603 and the flip-flops 601 and 602. When the output is low, the binary counter 603 and the flip-flop 602 are reset. The COUNT_ENABLE port of the $\mu P$ 1 represents a counting status line that is connected between the Q-port of the flip-flop 601 and the J and K ports of the flip-flop 602, and assumes a counting state when it is at high potential. The clock input of the flip-flop 602, CLK, is connected to an oscillator of the system with a frequency of $f_{osc}$. The output frequency of the flip-flop 602 is $f_{osc}/2$ and therefore the flip-flop 602 serves as a single-bit counter or a frequency divider. The $\mu P$ 1 excites a RESET signal via the RESET terminal when a positioning scanning process begins. This will pull the Q output of the flip-flop 602 and the binary counter 603 low resulting a reset of counting. The counting lasts until a negative edge trigger signal from the comparator 502 of the coordinate acquisition circuit 5 enters the CLK port of the flip-flop 601. This pulls the Q output of the flip-flop 601 low and thereby ends the present counting. The timing diagram of the counting circuit 6 is shown in FIG. 8.

Figure 9:
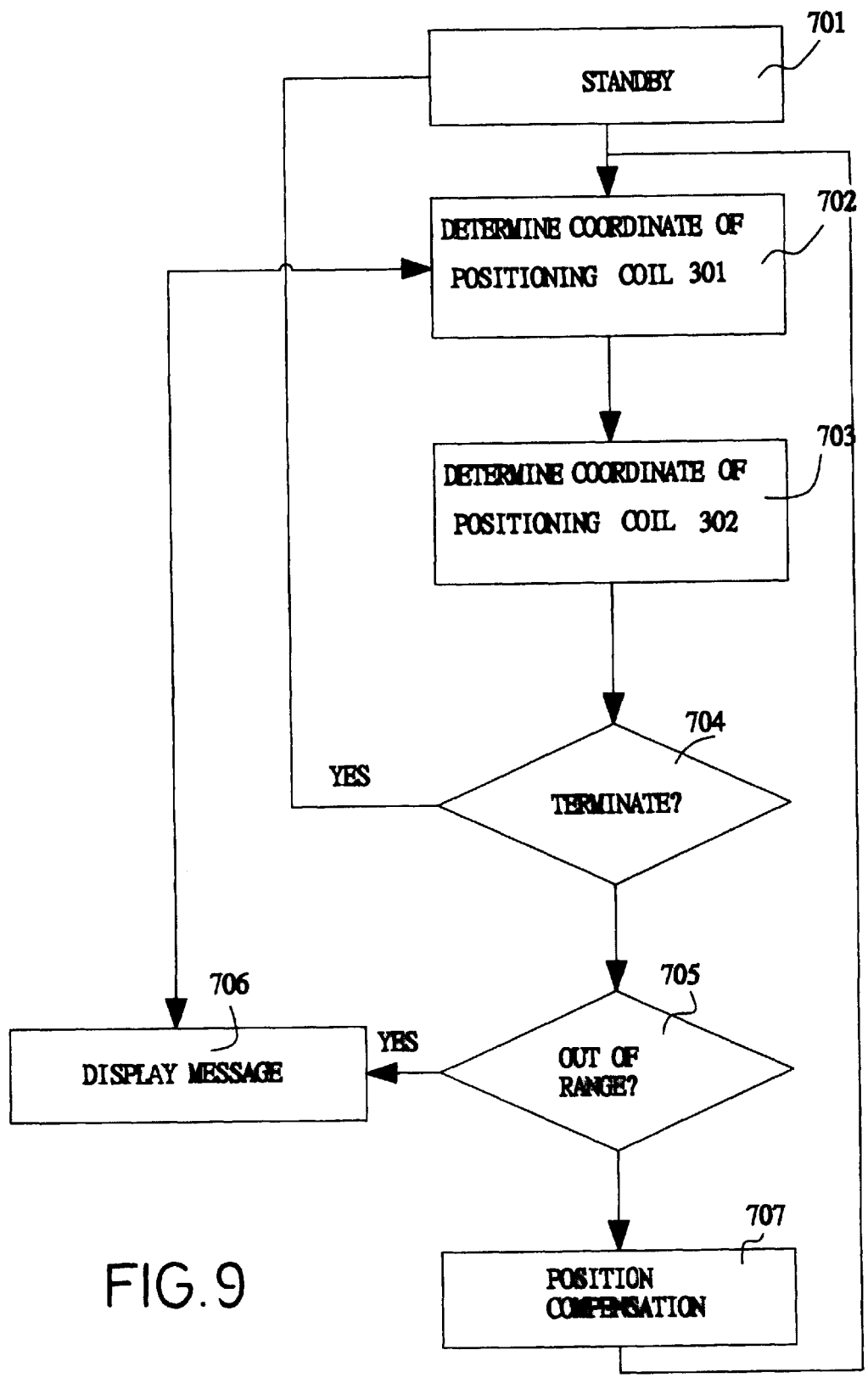
FIG. 9 shows a software flow chart of operation of line object positioning.

When a position scan begins, the $\mu P$ 1 enters to a position scanning state from a stand-by state 701 to perform operations indicated by a flow chart shown in FIG. 9. The execution indicates a coordinate scan beginning from the point A (positioning coil 301) 702. At this time, the $\mu P$ 1 scans the coordinate grid lines along an X-axis direction and derives the positioning coil 301 with center point A so that a time-varying magnetic field is generated. The $\mu P$ 1 also switches channels of the MUXs with a frequency of $f_1/2$ to scan the coordinate grid lines in sequence. The X-axis coordinate of the point A is determined after the $\mu P$ 1 scans all the coordinate lines in the X-axis direction sequentially. The $\mu P$ 1 further scans grid lines along a Y-axis direction following the same procedure described above. Accordingly, the Y-axis coordinate of the point A is determined after the $\mu P$ 1 scans all of the grid lines along the Y-axis direction in sequence.

Subsequently, the $\mu P$ 1 proceeds to scan the X-axis coordinate and the Y-axis coordinate lines for the other positioning coil 302 with the center point B to determine the X-axis coordinate and the Y-axis coordinate of the point B and then records the coordinate of the point B (positioning coil 302) 703.

This completes a scanning procedure to determine the coordinates of points A and B through which the position of the line object can be located. If the system receives an instruction of termination 704 during performing coordinate acquisition 702 and 703, the control flow of the program returns to the stand-by state 701. Note that the positioning coils 301 or 302 may move out of the effective positioning area of the grid-shaped conductors 403, which will result in unavailability of position acquisition of point A or point B. Once the system realizes this out-of-range situation 705, the status should be reported 706 and the control flow returns to the stand-by state 701.

Finally, real-time position compensation 707 is carried out to offset the error resulting from the displacement of the positioning coils 301 and 302 to the target line object. A simple position compensation method is disclosed in the present invention to furnish this purpose and will be described below.

The operation flow described above is carried out repeatedly until the process of tracing the trajectory of the movement of the target line object is terminated.

The present invention brings forth a simple position compensation method to offset the error resulting from the displacement between the positioning coils 301 and 302 and the target line object. The displacement error is resulted from (1) physical alignment of positioning coils 301 and 302 and the target line object; and (2) operation precision of workmanship when installing the components of the present invention in the enclosures. The position compensation method is used to offset the physical displacement between the positioning coils and the target line object every time the coordinates of the two positioning coils 301 and 302 are determined.

Figure 10:
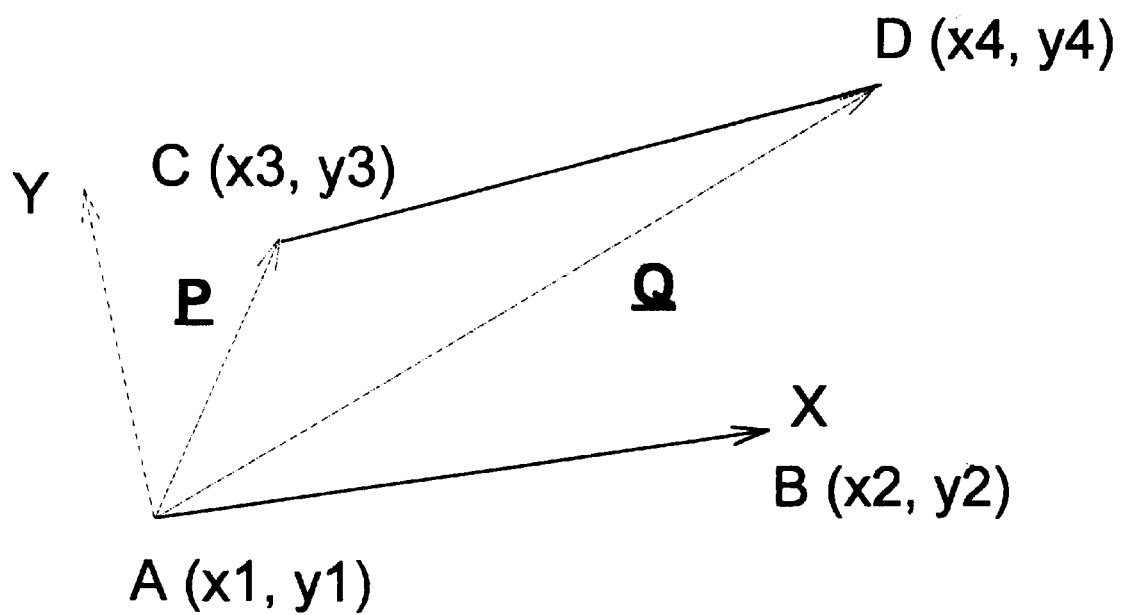
FIG. 10 shows the spatial relation in a two-dimensional space where positions of the pointing devices are represented by A ($X_1$, $Y_1$) and B ($X_2$, $Y_2$), positions of the two ends of the target line object are represented by C ($X_3$, $Y_3$) and D ($X_4$, $Y_4$), and the displacements from point A to points C and D are represented by vectors P and Q, respectively.

Suppose the actual coordinates of the two ends of the target line object are $C(x_3, y_3)$ and $D(x_4, y_4)$, and the coordinates of the positioning coils 301 and 302 in accordance with the present invention are $A(x_1, y_1)$ and $B(x_2, y_2)$. The spatial relationship of points A, B, C and D is illustrated in FIG. 10. The geometrical relationship of these four points can be represented by the formulas listed below:

$$x_3-x_1=s(x_2-x_1)-t(y_2-y_1)=p_1$$

$$y_3-y_1=s(y_2-y_1)+t(x_2-x_1)=p_2$$

$$x_4-x_1=m(x_2-x_1)-n(y_2-y_1)=q_1$$

$$y_4-y_1=m(y_2-y_1)+n(x_2-x_1)=q_2$$

Here, $P=(p_1, p_2)$ and $Q=(q_1, q_2)$ are the displacement vectors measuring from point A to point C and from point A to point D, respectively. As long as the relative positions of points A, B and the line object CD are not changed, the aforementioned formulas are always valid. In other words, the values of s, t, m, and n will not be changed when the line object CD together with the positioning ends A and B are moving around on the planar tablet. This is the basic principle employed in the position compensation method.

This simple method, however, requires a prior knowledge of the physical offset in between the positioning coils and the target line object. In other words, the usefulness of the present invention for locating the target line object requires an ability to determine such displacement before actual positioning of the line object is carried out. Position compensation is therefore required to perform detection of displacement error in the calibration mode and conduct real-time offsetting of the displacement error when the apparatus is operated in the on-line positioning mode.

The detail of the position compensation method of the present invention is described as follows:

During the calibration mode, the coordinates of $C(x_3, y_3)$ and $D(x_4, y_4)$ are determined by some mechanism implemented by a particular application. An example to which the present invention is applied will be described later where a simple method to obtain the coordinates of $C(x_3, y_3)$ and $D(x_4, y_4)$ will be presented.

Once the coordinates of $A(x_1, y_1)$, $B(x_2, y_2)$, $C(x_3, y_3)$ and $D(x_4, y_4)$ are determined, the compensation parameters s, t, m, n can be derived by:

$$s=(p_1 x_0+p_2 y_0)/(x_0^2+y_0^2)$$

$$t=(p_2 x_0-p_1 y_0)/(x_0^2+y_0^2)$$

$$m=(q_1 x_0+q_2 y_0)/(x_0^2+y_0^2)$$

$$n=(q_2 x_0-q_1 y_0)/(x_0^2+y_0^2)$$

where $x_0=x_2-x_1$, $y_0=y_2-y_1$

If the positioning coils 301 and 302 are firmly installed, the positions of the positioning points A and B relative to the line object remain unchanged and as such the derivation of the compensation parameters s, t, m, and n does not need to be conducted every time when operation of tracing the trajectory of the movement of the target line object is performed. Namely, the calibration mode only needs to be carried out once in a while for fine tuning the accuracy of the positioning operation.

When operating in the on-line positioning mode, the system performs real-time position compensation 707 after the coordinates of the positioning points A' ($x'_1, y'_1$) and B' ($x'_2, y'_2$) are determined. The coordinates of the end points of the target line object, C' ($x'_3, y'_4$) and D' ($x'_4, y'_4$), at the time that positioning is performed can be derived by the following formulas:

$$x'_3=x'_1+s(x'_2-x'_1)-t(y'_2-y'_1)$$

$$y'_3=y'_1+s(y'_2-y'_1)+t(x'_2-x'_1)$$

$$x'_4=x'_1+m(x'_2-x'_1)-n(y'_2-y'_1)$$

$$y'_3=y'_1+m(y'_2-y'_1)+n(x'_2-x'_1)$$

The essential condition to calculate the above formulas is to have the values of the compensation parameters, s, t, m, and n, available prior to positioning of the line object being carried out. This requires having a certain mechanism to determine the displacement of the positioning coils 301 and 302 from the corresponding end points of the target line object, or equivalently, the positions where the positioning coils 301 and 302 and the target line object are located. This can be achieved when the positioning apparatus of the present invention is integrated with an image scanning device as such the image scanning device can work as a visual input to detect the displacement of each positioning coil to its corresponding end point of the target line object.

Figure 11:
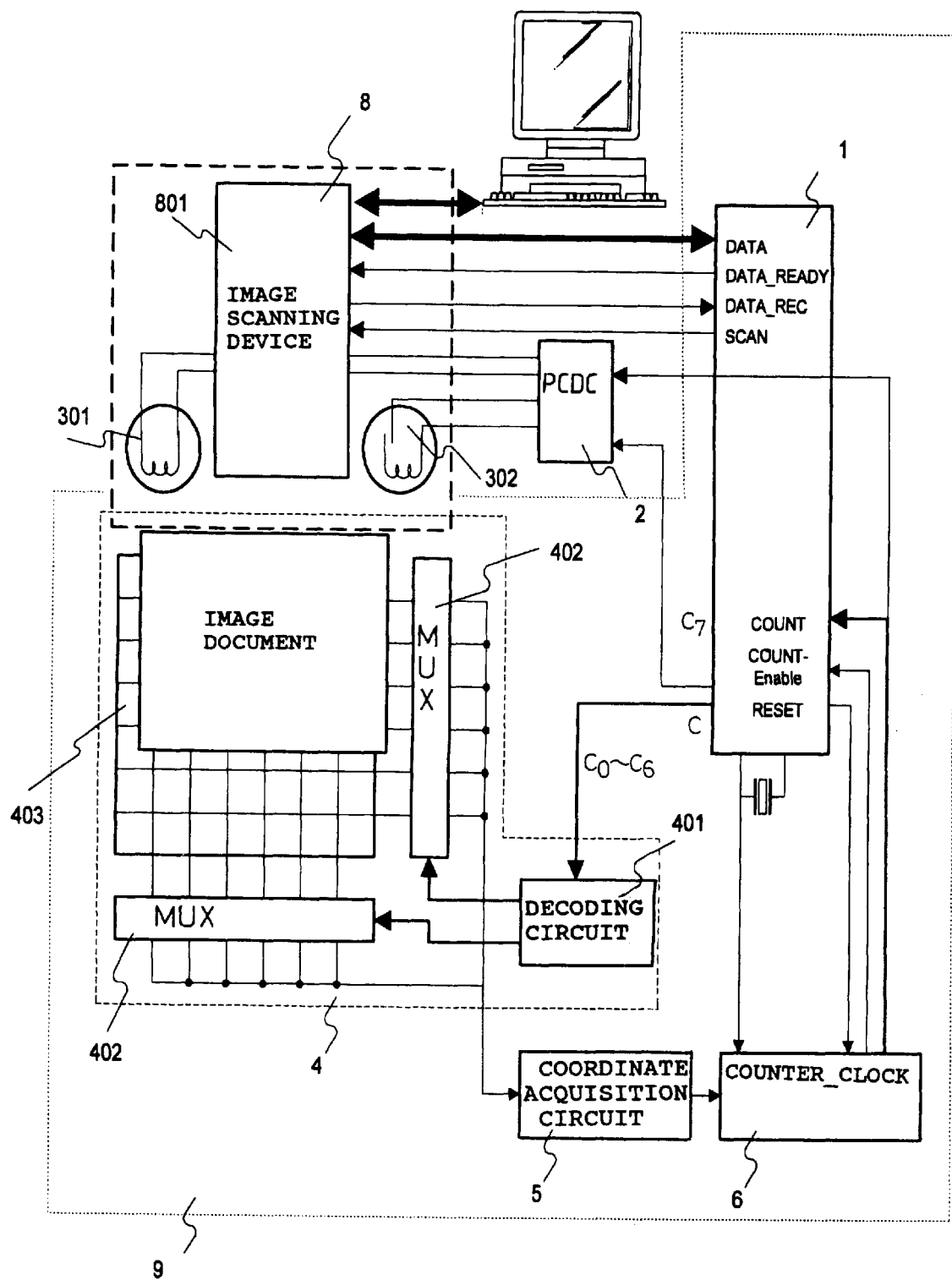
FIG. 11 shows a practical application embodiment with configuration of an image-scanning system so constructed to employ a new manner of image scanning when an image-scanning device is utilized in connection with the line segment positioning apparatus of the present invention.

Integration of the positioning apparatus of the present invention with an image scanning device brings forth a new architecture of image scanning system as illustrated in FIG. 11. This new image scanning system can scan images together with the positions where the image is located and thus offers a new way of image scanning that differs from any of the prior art of image scanners nowadays. The image scanning system is composed of a hand held image-position scanner 8 and a tablet 9. The hand-held image-position scanner 8 is constructed by an image scanning device 801 and two positioning coils 301 and 302, while the tablet 9, which is used for determining positional coordinates, is constructed by a µP 1, two positioning coil driving circuits 2, a planar sampling circuit 4, a coordinate acquisition circuit 5, and a counting circuit 6. The image scanning device 801 in the hand-held image-position scanner 8 is a conventional image scanning device which is constructed by optical sensing components for capturing image data from a document on the tablet 9. These optical sensing components may be constructed by charge coupled devices (CCDs) and the related optical components such as light tubes, mirrors, lenses, and so on, or by a contack image sensor (CIS). When the µP 1 excites a SCAN signal from the SCAN port thereon, the image scanning device 801 drives the optical sensing component immediately to scan in an image line and stores the image data of that scan line in the memory buffer of the image scanning device 801. At the same time, the line segment positioning apparatus of the present invention locates the positions of the two ends of the target line object (which here is the image scan line). Though mechanically it is not feasible to install the two positioning coils 301 and 302 exactly at the two ends of the image scan line, the displacements of the positioning points to the actual end points of the target image scan line can be offset by performing the aforesaid position compensation. After the µP 1 determines the coordinates of the two ends of the image scan line through performing position compensation as described above, the coordinates are sent to the image scanning device 801 via the data ports $D_0 \sim D_7$ of µP 1. The asynchronous data transfer is achieved by handshaking via Data_Ready and Data_Rec. The image scanning device 801 then combines these captured coordinates and image data of the corresponding scan line, and uploads them to a computer for subsequent processing. Since positional coordinates of two ends of the image scan line are determined, positional coordinates of each image pixel on this image scan line can thereof be determined by performing interpolation via the coordinates of the two end points. Consequently, the positional coordinate of each image pixel on a document on the positioning tablet 9 can be uniquely determined. The resultant computer image can thereupon be stored in a storage system where each image pixel is stored in a memory location corresponding to a positional coordinate relative to the positioning tablet.

While using the aforementioned image scanning system, which is an integration of an image scanning device 801 and the line segment positioning apparatus of the present invention, the calibration mode of the position compensation is operated by the following procedures:

(a) Place a test sheet on the predetermined location of the planar tablet. On the test sheet, a line is printed at a pre-designated location as the test pattern.

(b) Scan in the line of the aforesaid test pattern by activating the hand-held image-position scanner 8 and moving the hand-held image-position scanner 8 around this test line.

(c) Stop scanning when the test pattern has been scanned in completely.

Figure 12:
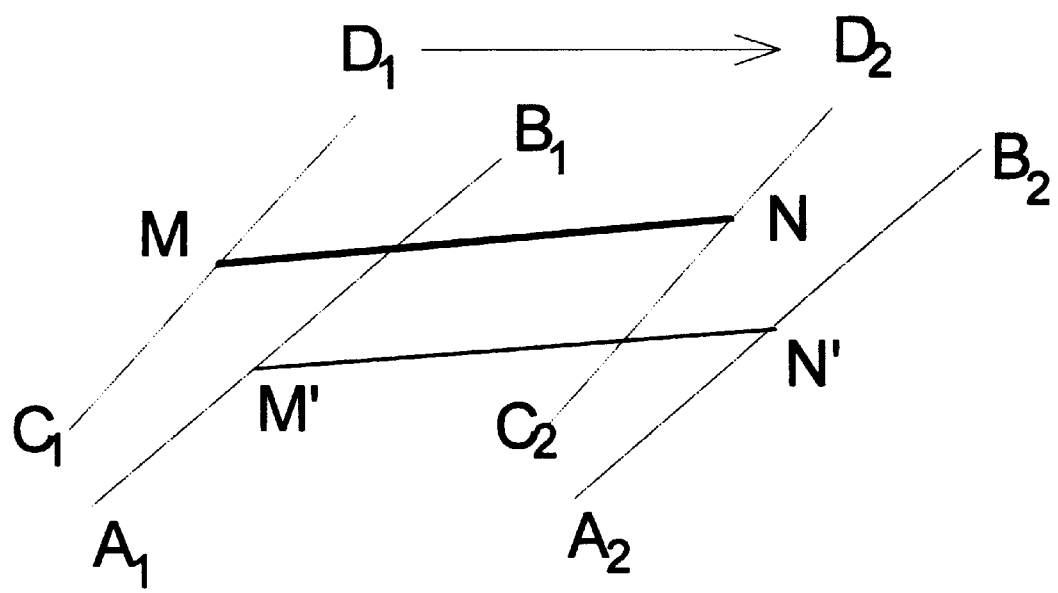
FIG. 12 shows the spatial relation in a two-dimensional space where the location of the test pattern is represented by a line segment MN while the location of the test pattern scanned and determined by the present invention without performing position compensation is represented by a line segment M'N'.

The compensation parameters s, t, m, and n can then be derived by the following:

As there exists displacement errors in between the positioning coils 301 and 302 and the image scan line, the trajectory of the movement of the image scan line and the trajectory of the positioned line segment (designated by the two positioning coils 301 and 302) are illustrated in FIG. 12. In FIG. 12, the line segment denoted by MN is the test pattern. The referenced coordinates of the two ends of this test line to the planar tablet 9 are M ($X_M$, $Y_M$) and N ($X_N$, $Y_N$), respectively. $A_1$ ($X_1$, $Y_1$) and $B_1$ ($X_1$, $Y_1$) are the coordinates located by the positioning coils 301 and 302 when the image line labeled $C_1D_1$ is scanned by the image scanning device 801; Similarly, $A_2$ ($X_2$, $Y_2$) and $B_2$ ($X_2$, $Y_2$) are the coordinates located by the positioning coils 301 and 302 when the image line $C_2D_2$ is scanned. Consequently, when the image scanning device 801 scans an image along the direction from $C_1D_1$ to $C_2D_2$ as illustrated in FIG. 12, the scanned image data is recorded in the storage device where the test line MN is actually stored in the location labeled as M'N'.

Since the coordinates of M and N are pre-determined, they are thus known values, while the coordinates of M' ($X_{M'}$, $Y_{M'}$) and N' ($X_{N'}$, $Y_{N'}$) can be determined by any line detection algorithm which is common in the field of image processing. Further, the coordinates of $A_1$, $B_1$, $A_2$, and $B_2$ can be determined by the line segment positioning apparatus of the present invention by the steps of:

(a) recording coordinates of two ends of the line segment each time an image scanning is activated and the visual perceptible information is captured and stored;

(b) scanning all the scanned and positioned line segments among which the one having the point M' ($X_{M'}$, $Y_{M'}$) located there on is the line segment having $A_1$ and $B_1$ as two ends, the coordinates of $A_1$ and $B_1$ are therefore determined;

(c) scanning all the scanned and positioned line segments among which the one having the point N' ($X_{N'}$, $Y_{N'}$) located there on is the line segment having $A_2$ and $B_2$ as two ends, the coordinates of $A_2$ and $B_2$ are thereoofre determined.

Through these known values, the relative location of $A_1B_1$ to $C_1D_1$ (and also $A_2B_2$ to $C_2D_2$) can be derived by tedious geometrical manipulation. The compensation parameters s, t, m, and n can then be represented by the following formulas:

$$s=(R_2s_1-R_1s_2)/(R_2-R_1)$$

$$t=(R_2t_1-R_1t_2)/(R_2-R_1)$$

$$m=[L_{CD}(S_1-S_2)+R_1s_2-R_2s_1]/(R_1-R_2)$$

$$n=[L_{CD}(t_1-t_2)+R_1t_2-R_2t_1]/(R_1-R_2)$$

where LCD is the length of the image scan line, $$s_1=(\Delta X_{R1}-\Delta X_1+\Delta Y_{R1}-\Delta Y_1)/(L_{AB})^2$$

$$t_1=(\Delta Y_{R1}-\Delta X_1+\Delta X_{R1}-\Delta Y_1)/(L_{AB})^2$$

$$s_2=(\Delta X_{R2}-\Delta X_2+\Delta Y_{R2}-\Delta Y_2)/(L_{AB})^2$$

$$t_2=(\Delta Y_{R2}-\Delta X_2+\Delta X_{R2}-\Delta Y_2)/(L_{AB})^2$$

$$R_1=[(X_{A1}-X_{M'})^2+(Y_{A1}-Y_{M'})^2]^{1/2};$$

$$R_2=[(X_{A2}-X_{N'})^2+(Y_{A2}-Y_{N'})^2]^{1/2};$$

$$L_{AB}=[(x_{A1}-x_{B1})^2+(y_{A1}-y_{B1})^2]^{1/2};$$

and $$\Delta X_1=X_{B1}-X_{A1};\ \Delta Y_1=Y_{B1}-Y_{A1};\ \Delta X_{R1}=X_M-X_{A1};\ \Delta Y_{R1}=Y_M-Y_{A1};$$

$$\Delta X_2=X_{B2}-X_{A2};\ \Delta Y_2=Y_{B2}-Y_{A2};\ \Delta X_{R2}=X_N-X_{A2};\ \Delta[Y_{R2}=Y_N-Y_{A2}.$$

The line segment positioning apparatus of the present invention can thus be used as an auxiliary tool of an image scanner for determining the location of the image scan line so that one may scan an image in a manner totally different from that of the conventional image scanners. The prior art of image scanners that may be of the types of flatbed, sheet-feed or hand-held, and so on, employ a simple principle that activates each image scanning by rotating a fixed angular phase of a motor or wheel. The objective of this technique is to achieve parallel and equally spaced image scan lines as such an image with predetermined resolution can be obtained. However, this idea is not realistic to hand-held image scanners as the friction between the roller of the hand-held image scanner and the document, when moving the hand-held image scanner across a document, always results in unequally spaced and nonparallel scan lines reflecting the nonuniform motion of the two ends of the hand-held image scanner. As a result, the scanned image may be deformed in which the resultant image may be shrunk at some points and expanded at other points.

Integration of the line segment positioning apparatus of the present invention with the image scanning device, however, can cope with the problem that a hand-held image scanner can not resolve. Specifically, through operating the hand-held image-position scanner 8, a user can scan an image along any direction as desired without deforming the resultant image. If the quality of a certain part of the image is not satisfactory, the user can re-scan that particular area to improve the image quality. This is because the operation of image scanning is in conjunction with positioning of the scanned image as such each scanned image pixel is stored in a corresponding memory location. Since the positions are allocated by offsetting the displacement errors via the position compensation method described above, the determination of memory location is totally dependent on the spatial information acquired from positioning operation of the present invention, not related to the time when scanning takes place.

Furthermore, since the scanned image data comes together with the corresponding spatial information, an image scanning can be operated by several passes through which a complete image can be achieved. This is a significant improvement from the prior art of hand-held image scanner. One of the limitations of the use of a hand-held image scanner is the difficulty in scanning an image which is larger than the scope that the hand-held image scanner can handle. In this case, multiple passes of image scanning are required. However, it is extremely difficult to merge the sub-images smoothly by the current technologies adopted by hand-held image scanners. If fact, none of the efforts made thus far, either by hardware or software, achieves a satisfactory result when multiple-pass image scanning is performed by a hand-held scanner.

Therefore, the present invention creates a new manner of image scanning that offers the flexibility of freehanded scanning of image document without deforming the image, and is a significant improvement of the conventional hand-held image scanners.

What is claimed is:

1. A method for offsetting error resulting from displacement between a line segment and a line object, comprising the steps of:

(a) determining compensation parameters by a calibration procedure;

(b) performing a real-time position compensation method for offsetting said displacement error when positional coordinates of a pair of pointers is determined wherein said calibration procedure comprises the steps of:
(a) determining the positional coordinates of end points of said line object $C(X_3, Y_3)$ and $D(X_4, Y_4)$;
(b) determining the positional coordinates of end points of said line object $A(X_1, Y_1)$ and $B(X_2, Y_2)$;
(c) deriving said compensation parameters by formulas:

$$s=(p_1 x_0+p_2 y_0)/(x_0^2+y_0^2)$$

$$t=(p_2 x_0-p_1 y_0)/(x_0^2+y_0^2)$$

$$m=(q_1 x_0+q_2 y_0)/(x_0^2+y_0^2)$$

$$n=(q_2 x_0-q_1 y_0)/(x_0^2+y_0^2)$$

where $x_0=x_2-x_1$, $y_0=y_2-y_1$, $p_i=x_3-x_1$, $p_2=y_3-y_1$, $q_1=x_4-x_1$, and $q_2=y_4-y_1$ where s, t, m, and n are said compensation parameters deriving by said calculation procedure.

2. The method in accordance with claim 1, wherein said line object is an object physically installed or logically perceptible having a measurable length and can be allocated by said line segment.

3. The method in accordance with claim 1, wherein said compensation parameters are used to transform positional coordinates of said pointers to coordinates of two ends of said line object.

4. The method in accordance with claim 1, wherein said real-time position compensation method comprising the steps of:
(j) determining the positional coordinates of said pointers of said line segment $A'(X'_1, Y'_1)$ and $B'(X'_2, Y'_2)$;
(k) determining the positional coordinates $C'(X'_3, Y'_3)$ and $D'(X'_4, Y'_4)$ of end points of a line object relative to said planar tablet by formulas:

$$x'_3=x'_1+s(x'_2-x'_1)-t(y'_2-y'_1)$$

$$y'_3=y'_1+s(y'_2-y'_1)+t(x'_2-x'_1)$$

$$x'_4=x'_1+m(x'_2-x'_1)-n(y'_2-y'_1)$$

$$y'_3=y'_1+m(y'_2-y'_1)+n(x'_2-x'_1)$$

where s, t, m, and n are said compensation parameters derived from said calibration procedure.

5. A method for determining a compensation parameters for a system to offset a displacement error using a real-time position compensation method to determine spatial information of an image scanning line object from a line segment, said method comprising the steps of:
(a) scanning a test line being located at a predetermined position relative to a planar tablet and being used as a test pattern;
(b) determining positional coordinates of said test line, $M'(X_{M'}, Y_{M'})$ and $N'(X_{N'}, Y_{N'})$, by a line detection technique;
(c) determining end points of said line segment $A_1(X_1, Y_1)$ and $B_1(X_1, Y_1)$ when said line segment moves across point $M'(X_{M'}, Y_{M'})$;
(d) determining end points of said line segment $A_2(X_2, Y_2)$ and $B_2(X_2, Y_2)$ when said line segment moves across point $N'(X_{N'}, Y_{N'})$;
(e) deriving said compensation parameters s, t, m, and n by formulas:

$$s=(R_2 s_1-R_1 s_2)/(R_2-R_1)$$

$$t=(R_2 t_1-R_1 t_2)/(R_2-R_1)$$

$$m=[L_{CD}(S_1-S_2)+R_1 s_2-R_2 s_1]/(R_1-R_2)$$

$$n=[L_{CD}(t_1-t_2)+R_1 t_2-R_2 t_1]/(R_1-R_2)$$

where $L_{CD}$ is the length of said line object, $$s_1=(\Delta X_{R1}-\Delta X_1+\Delta Y_{R1}-\Delta Y_1)/(L_{AB})^2$$

$$t_1=(\Delta Y_{R1}-\Delta X_1+\Delta X_{R1}-\Delta Y_1)/(L_{AB})^2$$

$$s_2=(\Delta X_{R2}-\Delta X_2+\Delta Y_{R2}-\Delta Y_2)/(L_{AB})^2$$

$$t_2=(\Delta Y_{R2}-\Delta X_2+\Delta X_{R2}-\Delta Y_2)/(L_{AB})^2$$

$$R_1=[(X_{A1}-X_{M'})^2+(Y_{A1}-Y_{M'})^2]^{1/2};$$

$$R_2=[(X_{A2}-X_{N'})^2+(Y_{A2}-Y_{N'})^2]^{1/2};$$

$$L_{AB}=(x_{A1}-x_{B1})^2+(y_{A1}-y_{B1})^2]^{1/2};$$

and $$\Delta X_1=X_{B1}-X_{A1}; \Delta Y_1=Y_{B1}-Y_{A1}; \Delta X_{R1}=X_M-X_{A1}; \Delta Y_{R1}=Y_M-Y_{A1};$$

$$\Delta X_2=X_{B2}-X_{A2}; \Delta Y_2=Y_{B2}-Y_{A2}; \Delta X_{R2}=X_N-X_{A2}; \Delta Y_{R2}=Y_N-Y_{A2}.$$

* * * * *